(12) United States Patent
Sullivan et al.

(10) Patent No.: US 11,900,411 B2
(45) Date of Patent: Feb. 13, 2024

(54) DYNAMIC AD INSERTION DECISION-MAKING FOR LINEAR LIVE TV

(71) Applicant: The Nielsen Company (US), LLC, New York, NY (US)

(72) Inventors: Jonathan Sullivan, Hurricane, UT (US); Yves Greatti, New York, NY (US); Thomas Harrington, New York, NY (US); Nico Van de Bovenkamp, Seattle, WA (US); Caleb Goertel, New York, NY (US); Marco Huertas, New York, NY (US)

(73) Assignee: Roku, Inc., San Jose, CA (US)

( * ) Notice: Subject to any disclaimer, the term of this patent is extended or adjusted under 35 U.S.C. 154(b) by 75 days.

(21) Appl. No.: 16/949,014

(22) Filed: Oct. 9, 2020

(65) Prior Publication Data
US 2021/0110430 A1    Apr. 15, 2021

Related U.S. Application Data

(60) Provisional application No. 62/914,290, filed on Oct. 11, 2019.

(51) Int. Cl.
*G06Q 30/0242* (2023.01)
*H04N 21/234* (2011.01)
(Continued)

(52) U.S. Cl.
CPC ......... *G06Q 30/0244* (2013.01); *G06F 16/26* (2019.01); *G06Q 30/0246* (2013.01);
(Continued)

(58) Field of Classification Search
CPC ........... G06Q 30/0244; G06Q 30/0246; G06Q 30/0247; G06Q 30/0269; G06Q 30/0272;
(Continued)

(56) References Cited

U.S. PATENT DOCUMENTS 10,313,262 B1 *  6/2019  Brasch ................... H04L 47/70
10,453,078 B2 * 10/2019  Subramanian ..... G06Q 30/0249
(Continued)

OTHER PUBLICATIONS

International Search Report dated Jan. 29, 2021, in International Application No. PCT/US2020/070645 filed Oct. 9, 2020, 4 pages.
(Continued)

*Primary Examiner* — Alexandru Cirnu
(74) *Attorney, Agent, or Firm* — Sterne, Kessler, Goldstein & Fox P.L.L.C.

(57) ABSTRACT

Example methods and systems for ad insertion decision-making comprise: identifying an ad insertion opportunity in which an underlying advertisement is available for replacement by an addressable advertisement; determining a first expected revenue corresponding to presentation of the addressable advertisement and a first expected cost corresponding to presentation of the addressable advertisement, wherein the first expected cost is based on a current pacing of an advertisement campaign of the addressable advertisement; determining a second expected revenue corresponding to presentation of the underlying advertisement and a second expected cost corresponding to presentation of the underlying advertisement, wherein the second expected cost is based on a current pacing of an advertisement campaign of the underlying advertisement; determining an expected value of the ad insertion based on the first and second expected revenues and the first and second expected costs; and causing performance of the ad insertion based on the expected value.

22 Claims, 6 Drawing Sheets

(51) Int. Cl.
  *H04N 21/81*   (2011.01)
  *H04N 21/258*  (2011.01)
  *G06F 16/26*   (2019.01)
  *G06Q 30/0273* (2023.01)
  *G06Q 30/0251* (2023.01)
  *G06Q 30/0272* (2023.01)
  *G06Q 30/0241* (2023.01)

(52) U.S. Cl.
  CPC ..... *G06Q 30/0247* (2013.01); *G06Q 30/0269* (2013.01); *G06Q 30/0272* (2013.01); *G06Q 30/0273* (2013.01); *H04N 21/23424* (2013.01); *H04N 21/25883* (2013.01); *H04N 21/812* (2013.01)

(58) Field of Classification Search
  CPC ................ G06Q 30/0273; G06F 16/26; H04N 21/23424; H04N 21/25883; H04N 21/812
  See application file for complete search history.

(56) References Cited

U.S. PATENT DOCUMENTS

| | | | | |
|---|---|---|---|---|
| 2002/0099600 | A1* | 7/2002 | Merriman | G06Q 30/0277 705/14.52 |
| 2009/0307088 | A1* | 12/2009 | Littlejohn | G06Q 30/0255 705/14.66 |
| 2011/0040614 | A1* | 2/2011 | Veach | G06Q 30/0247 705/14.42 |
| 2013/0013421 | A1* | 1/2013 | Sharma | G06Q 30/0251 705/14.71 |
| 2013/0060629 | A1 | 3/2013 | Rangsikitpho et al. | |
| 2013/0160045 | A1 | 6/2013 | Khare | |
| 2014/0129325 | A1 | 5/2014 | Zinger et al. | |
| 2014/0278938 | A1* | 9/2014 | Hughes | G06Q 30/0273 705/14.45 |
| 2014/0372202 | A1* | 12/2014 | Hummel | G06Q 30/0242 705/14.41 |
| 2015/0365713 | A1 | 12/2015 | Brandstetter | |
| 2016/0037201 | A1* | 2/2016 | Kitts | H04N 21/812 725/35 |
| 2018/0174191 | A1* | 6/2018 | Min | G06Q 30/0272 |
| 2019/0108556 | A1 | 4/2019 | Maher et al. | |

OTHER PUBLICATIONS

Written Opinion dated Jan. 29, 2021, in International Application No. PCT/US2020/070645 filed Oct. 9, 2020, 4 pages.

First Office Action for Taiwanese Patent Application No. 109135184, dated Oct. 12, 2021, 16 pages.

\* cited by examiner

DYNAMIC AD INSERTION DECISION-MAKING FOR LINEAR LIVE TV

CROSS-REFERENCE TO RELATED APPLICATION

This application claims priority to U.S. Provisional Patent Application No. 62/914,290, filed on Oct. 11, 2019, which is hereby incorporated by reference in its entirety. USAGE AND TERMINOLOGY In this disclosure, unless otherwise specified and/or unless the particular context clearly dictates otherwise, the terms "a" or "an" mean at least one, and the term "the" means the at least one.

SUMMARY

In one aspect, an example method is disclosed. The method involves identifying, by a computing system, an ad insertion opportunity in which an underlying advertisement is available for replacement by an addressable advertisement; determining, by the computing system, a first expected revenue corresponding to presentation of the addressable advertisement and a first expected cost corresponding to presentation of the addressable advertisement, wherein the first expected cost is based on a current pacing of an advertisement campaign of the addressable advertisement; determining, by the computing system, a second expected revenue corresponding to presentation of the underlying advertisement and a second expected cost corresponding to presentation of the underlying advertisement, wherein the second expected cost is based on a current pacing of an advertisement campaign of the underlying advertisement; determining, by the computing system, an expected value of the ad insertion based on the first and second expected revenues and the first and second expected costs; and causing, by the computing system, performance of the ad insertion based on the expected value.

In another aspect, an example computing system is disclosed. The computing system includes one or more processors and a non-transitory, computer-readable medium having stored thereon program instructions that, when executed by the one or more processors, cause the computing system to perform operations. The operations include identifying an ad insertion opportunity in which an underlying advertisement is available for replacement by an addressable advertisement; determining a first expected revenue corresponding to presentation of the addressable advertisement and a first expected cost corresponding to presentation of the addressable advertisement, wherein the first expected cost is based on a current pacing of an advertisement campaign of the addressable advertisement; determining a second expected revenue corresponding to presentation of the underlying advertisement and a second expected cost corresponding to presentation of the underlying advertisement, wherein the second expected cost is based on a current pacing of an advertisement campaign of the underlying advertisement; determining an expected value of the ad insertion based on the first and second expected revenues and the first and second expected costs; and causing performance of the ad insertion based on the expected value.

In another aspect, an example non-transitory, computer-readable medium is disclosed. The computer-readable medium has stored thereon program instructions that, when executed by one or more processors of a computing system, cause the computing system to perform operations. The operations include identifying an ad insertion opportunity in which an underlying advertisement is available for replacement by an addressable advertisement; determining a first expected revenue corresponding to presentation of the addressable advertisement and a first expected cost corresponding to presentation of the addressable advertisement, wherein the first expected cost is based on a current pacing of an advertisement campaign of the addressable advertisement; determining a second expected revenue corresponding to presentation of the underlying advertisement and a second expected cost corresponding to presentation of the underlying advertisement, wherein the second expected cost is based on a current pacing of an advertisement campaign of the underlying advertisement; determining an expected value of the ad insertion based on the first and second expected revenues and the first and second expected costs; and causing performance of the ad insertion based on the expected value.

DETAILED DESCRIPTION

I. Overview

Figure 1:
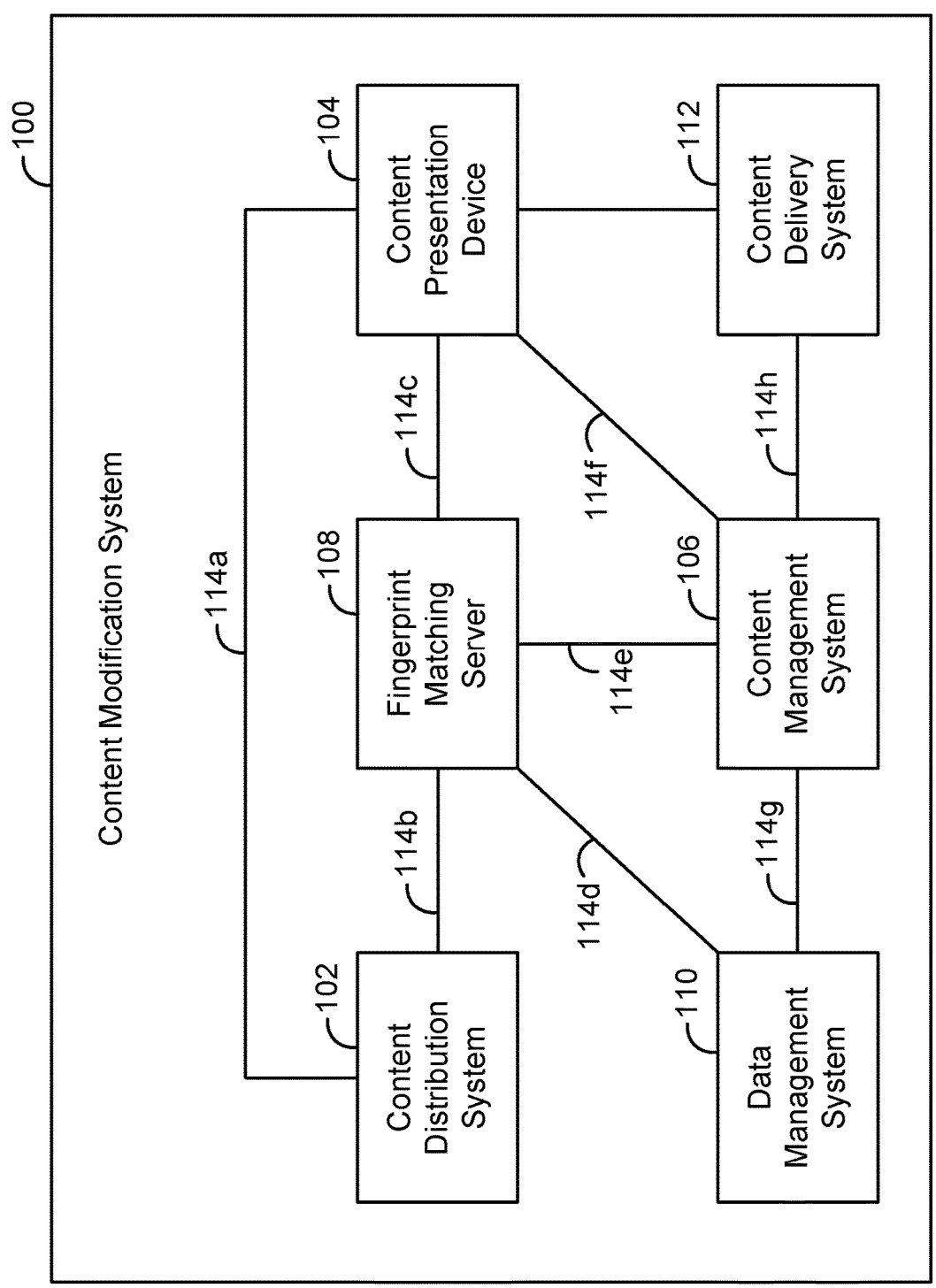
FIG. 1 is a simplified block diagram of an example content modification system in which various disclosed principles can be implemented.

In order to deliver and present content to end-users, a content provider can transmit the content to one or more content distribution systems, each of which in turn can transmit the content to one or more respective content presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content distribution systems that serve respective designated market areas (DMAs) within the United States. Each such content distribution system can thus receive the national satellite feed carrying the video content and can transmit the video content to television sets and/or set-top boxes in the content distribution system's DMA, such that the video content can be output for presentation to respective end-users in that DMA. In practice, these content distribution systems and their means of transmission to content presentation devices can take various forms. For instance, a content distribution system can be associated with a cable-television provider and can transmit video content to content presentation devices of end-users who are cable-television subscribers through hybrid fiber/coaxial cable connections.

As such, in various scenarios, a content distribution system can transmit content to a content presentation device, which can receive and output the content for presentation to an end-user. In some situations, even though the content presentation device receives content from the content distribution system, rather than outputting for presentation the content as received, it may be desirable for the content presentation device to output for presentation a modified version of the content instead.

For example, in the case where the content presentation device receives a linear sequence of content segments that includes a first advertisement segment, it can be desirable for the content presentation device to replace the first advertisement segment with a second advertisement segment that is perhaps more targeted to the end-user. As another example, it can be desirable for the content presentation device to overlay on the first advertisement segment, overlay content that enhances the first advertisement in a way that is again perhaps more targeted to the end-user.

In these examples and others described herein, the first advertisement that is originally scheduled for presentation is referred to as an "underlying advertisement" or "underlying content," the second advertisement or overlay content that is ultimately presented to the end-user is referred to as an "addressable advertisement" or "addressable content," and the process of presenting the second advertisement in place of the first advertisement or overlaying content on the first advertisement is referred to as "ad insertion."

While ad insertion can be beneficial for presenting targeted advertisements to an end-user, there may be circumstances in which ad insertion is undesirable. As an example, advertisements can be distributed as part of an advertisement campaign that can specify various campaign parameters, such as a duration of the campaign, a desired number and/or frequency of advertisement impressions throughout the campaign duration, or a target consumer demographic, to name a few. The underlying advertisement and/or the addressable advertisement can be associated with respective advertisement campaigns having such parameters, and performing ad insertion can negatively impact one or both of the campaigns. For instance, performing ad insertion can cause the number of presented underlying advertisements to fall significantly below the desired number, and/or it can cause the number of presented addressable advertisements to increase significantly above the desired number. Another example of an undesirable consequence of ad insertion includes causing a less profitable advertisement to be presented (e.g., when the addressable advertisement has a lower cost per mille (CPM) than the underlying advertisement). Other examples are possible as well.

As such, it can be desirable to consider various advertisement campaign parameters, as well as various other factors, when determining whether to perform ad insertion, and example systems and methods for doing so are described in further detail below.

II. Ad Insertion Systems

FIG. 1 is a simplified block diagram of an example content modification system 100. The content modification system 100 can include various components, such as a content distribution system 102, a content presentation device 104, a content management system 106, a fingerprint matching server 108, a data management system 110, and/or a content delivery system 112.

The content modification system 100 can also include one or more connection mechanisms that connect various components within the content modification system 100. For example, the content modification system 100 can include connection mechanisms 114a-h that connect components of the content modification system 100, as shown in FIG. 1.

In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication network (e.g., the Internet). In some instances, a connection mechanism can include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content modification system 100 and/or components thereof can take the form of a computing system.

Figure 2:
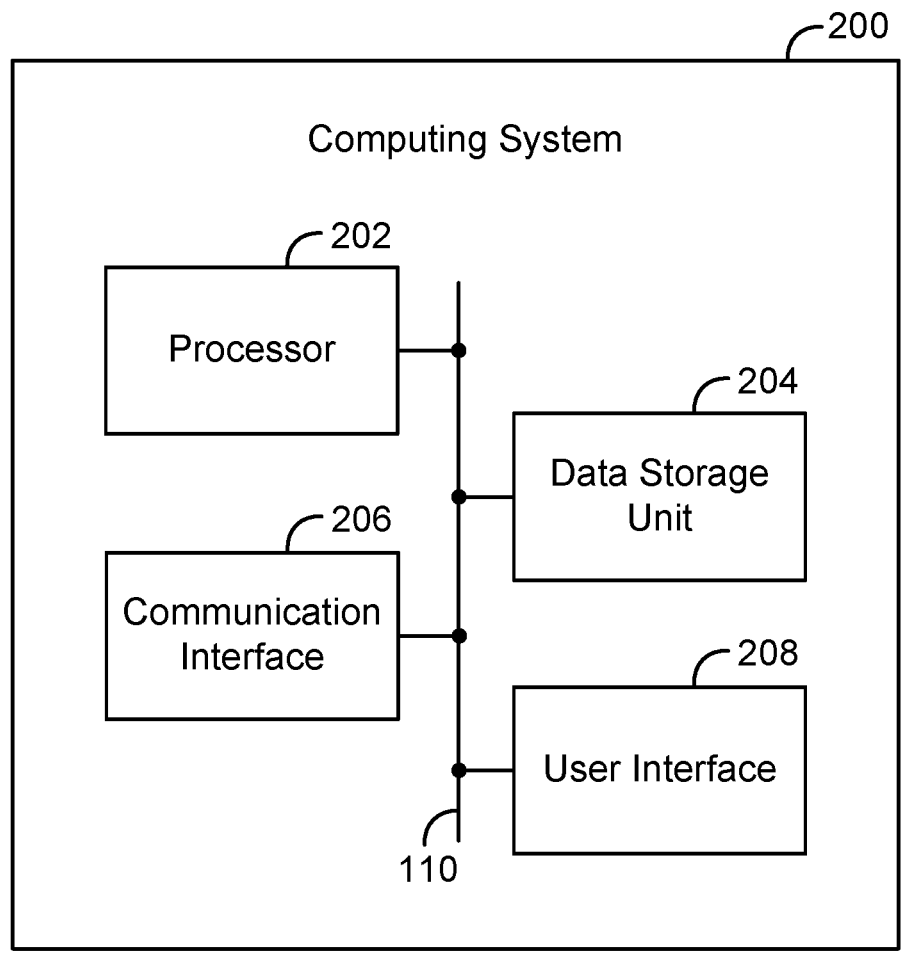
FIG. 2 is a simplified block diagram of an example computing system in which various disclosed principles can be implemented.

FIG. 2 is a simplified block diagram of an example computing system 200. The computing system 200 can be configured to perform and/or can perform one or more acts, such as the acts described in this disclosure. The computing system 200 can include various components, such as a processor 202, a data storage unit 204, a communication interface 206, and/or a user interface 208.

The processor 202 can include a general-purpose processor (e.g., a microprocessor) and/or a special-purpose processor (e.g., a digital signal processor). The processor 202 can execute program instructions included in the data storage unit 204 as described below.

The data storage unit 204 can include one or more volatile, non-volatile, removable, and/or non-removable storage components, such as magnetic, optical, and/or flash storage, and/or can be integrated in whole or in part with the processor 202. Further, the data storage unit 204 can take the form of a non-transitory computer-readable storage medium, having stored thereon program instructions (e.g., compiled or non-compiled program logic and/or machine code) that, upon execution by the processor 202, cause the computing system 200 and/or another computing system to perform one or more acts, such as the acts described in this disclosure. These program instructions can define, and/or be part of, a discrete software application.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. Thus, the computing system 200 can transmit data to, and/or receive data from, one or more other entities according to one or more protocols. In one example, the communication interface 206 can be a wired interface, such as an Ethernet interface. In another example, the communication interface 206 can be a wireless interface, such as a cellular or WI-FI interface.

The user interface 208 can allow for interaction between the computing system 200 and a user of the computing system 200, if applicable. As such, the user interface 208 can include input components such as a keyboard, a mouse, a remote controller, a microphone, and/or a touch-sensitive panel and/or output components such as a display device (which, for example, can be combined with a touch-sensitive panel) and/or a sound speaker.

The computing system 200 can also include one or more connection mechanisms that connect various components within the computing system 200. For example, the computing system 200 can include a connection mechanism 210 that connects components of the computing system 200, as shown in FIG. 2.

In some configurations, the computing system 200 can include one or more of the above-described components and can be arranged in various ways. For example, the computer system 200 can be configured as a server and/or a client (or perhaps a cluster of servers and/or a cluster of clients) operating in one or more server-client type arrangements, for instance.

As noted above, the content modification system 100 and/or components thereof can take the form of a computing system, such as the computer system 200. In some cases, some or all these entities can take the form of a more specific type of computing system. As illustrative examples, the content presentation device 104 can take the form of a desktop computer, a laptop, a tablet, a mobile phone, a television set, a set-top box, a television set with an integrated set-top box, a media dongle, or a television set with a media dongle connected to it, among other possibilities.

III. Ad Insertion Operations

Referring back to FIG. 1, the content distribution system 102 can perform operations related to obtaining and transmitting content such as video content and/or audio content. For example, the content distribution system 102 can receive content (e.g., from a content provider) and can transmit the content to the content presentation device 104. By way of example, the content distribution system 102 can be a cable-television head-end that is associated with a cable-television provider and that transmits content to the content presentation device 104 through hybrid fiber/coaxial cable connections. As another example, the content distribution system 102 can be a satellite-television head-end that is associated with a satellite-television provider and that transmits content to the content presentation device 104 through a satellite transmission. As yet another example, the content distribution system 104 can be a television-broadcast station that is associated with a television-broadcast provider and that transmits content through a terrestrial over-the-air interface to the content presentation device 104.

The content presentation device 104 can perform operations related to obtaining and outputting content for presentation. For example, the content presentation device 104 can receive the content transmitted by the content distribution system 102 and can output the content for presentation to an end-user. In some cases, the content presentation device 104 can select a channel from among multiple available channels, perhaps based on input received via a user interface, such that the content presentation device 104 can tune to, receive, and/or output for presentation, content of the selected channel. The content presentation device 104 can take various forms, such as that of a television set, a set-top box, or a media dongle, among other possibilities.

In line with the discussion above, when performing an ad insertion process, the content presentation device 104 can output for presentation a modified version of the content received from the content distribution system 102.

To perform the ad insertion process, the content management system 106 can receive an underlying advertisement segment that has been identified as a candidate to be replaced or otherwise modified. In one example, a user, perhaps associated with the content distribution system 102, can upload the underlying advertisement segment to the content management system 106, such that the content management system 106 can receive it in this way.

The content management system 106 can then generate fingerprint data representing the underlying advertisement segment. The content management system 106 can generate the fingerprint data using any content fingerprinting process now known or later developed. The content management system 106 can also generate various types of metadata associated with the modifiable content segment and/or the generated fingerprint data. The metadata can include information about the underlying advertisement segment, such as a duration of the segment, a segment identifier, a title, and/or specifics about permissible ways in which the underlying advertisement segment can be modified, etc.

The content management system 106 can then store and transmit the generated fingerprint data and the associated metadata to the fingerprint matching server 108, which the fingerprint matching server 108 can receive and use (along with other fingerprint data as described below) to identify an upcoming ad insertion opportunity on a channel of content being broadcast by the content distribution system 102.

To allow the fingerprint matching server 108 to identify such an upcoming ad insertion opportunity, the fingerprint matching server 108 can start by identifying a channel on which the content presentation device 104 is receiving content and/or outputting content for presentation. The fingerprint matching server 108 can do this by comparing and detecting a match between two different instances of fingerprint data. The first is fingerprint data representing content transmitted by the content distribution system 102 on a known channel (referred to herein in this context as "reference fingerprint data" and "reference content," respectively). And the second is fingerprint data representing content received and/or output for presentation by the content presentation device 104 on an unknown channel (referred to herein in this context as "query fingerprint data" and "query content," respectively).

The reference fingerprint data can be generated by the content distribution system 102, and the query fingerprint data can be generated by the content presentation device 104. The content distribution system 102 can transmit the reference fingerprint data to the fingerprint matching server 108, and the content presentation device 104 can transmit the query fingerprint data to the fingerprint matching server 108.

The fingerprint matching server 108 can then compare the reference fingerprint data and the query fingerprint data to determine whether there is a match. The fingerprint matching server 108 can compare and match fingerprint data using any content fingerprint comparing and matching process now known or later developed.

In practice, the fingerprint matching server 108 is likely to compare the query fingerprint data with many different reference fingerprint data sets, each corresponding with a different respective channel. In this context, responsive to detecting a match, the fingerprint matching server 108 can identify the channel on which the content presentation device 104 is receiving and/or outputting for presentation the query content. In one example, the fingerprint matching server 108 can do this by determining that the query content is being received by and/or output for presentation on the channel identified by channel identifier metadata associated with the reference fingerprint data that was used in detecting the match.

After the fingerprint matching server 108 identifies the channel on which the content presentation device 104 is receiving and/or outputting for presentation content, the fingerprint matching server 108 can perform additional acts. For example, the fingerprint matching server 108 can identify an upcoming ad insertion opportunity on the identified channel, and/or generate and transmit data to the content presentation device 104 to facilitate the content presentation device 104 performing an ad insertion operation in connection with the identified ad insertion opportunity.

In order to use the reference fingerprint data to identify an upcoming ad insertion opportunity on the identified channel, the content presentation device 104 can analyze metadata corresponding to reference fingerprint data for upcoming reference content and, based on the metadata, can determine time points at which an upcoming ad insertion opportunity starts and ends (referred to herein as the "modification start time" and the "modification end time," respectively).

Before the modification start time (e.g., ten seconds before), the content presentation device 104 can request addressable content that can be used in connection with performing the content modification operation. In one example, the content presentation device 104 can transmit a request for addressable content to the content management system 106. In some cases, the request can specify selection criteria for the addressable content, which the content presentation device 104 can determine based on metadata associated with the ad insertion opportunity, that the content presentation device 104 receives from the fingerprint matching server 108, for instance.

For example, the request can specify criteria for the addressable content, such as a type (e.g., a replacement content segment or overlay content), a duration (e.g., 15 seconds, 30 seconds, or 60 seconds), an aspect ratio (e.g., 4:3 or 16:9), and/or a resolution (e.g., 720p or 1080p). In another example, the request can include a content segment identifier.

The content management system 106 can receive this request and use it to select addressable content from among multiple content items that are available for selection. In some cases, the content management system 106 can consider various data to help inform which addressable content to select. For example, the content management system 106 can consider historical content consumption data for the content presentation device 104 and/or demographic data associated with that the content presentation device 104, either of which the content management system 106 can receive from the data management system 110, for instance.

The content management system 106 can then cause the selected addressable content to be transmitted to the content presentation device 104. In one example, the content management system 106 can do this by communicating with a content delivery system 112 that can host the addressable content. The content delivery system 112 can take various forms and can include various components, such as a content distribution network (CDN).

In one configuration, the content management system 106 can request from the content delivery system 112, a link (e.g., a URL) to the hosted addressable content. The content delivery system 112 can receive and respond to this request by transmitting the requested link to the content management system 106, which in turn can transmit the link to the content presentation device 104. The content presentation device 104 can receive the link and use it to retrieve the addressable content from the content delivery system 112, such that the content presentation device 104 can use the retrieved addressable content in connection with performing the content modification operation.

As such, in some examples, the content presentation device 104 can receive the underlying content segment from one source (e.g., the content distribution system 102), and the addressable content from another source (e.g., the content delivery system 112). These segments can also be transmitted to and received by the content presentation device 104 in different ways. For example, the content distribution system 102 can transmit, and the content presentation device 104 can receive, the underlying content segment as a broadcast stream transmission, whereas the content delivery system 112 can transmit, and the content presentation device 104 can receive, the addressable content as an over-the-top (OTT) transmission. In this context, the content distribution system 102 can receive the underlying content segment via one communication interface (e.g., an HDMI interface), and the content presentation device 104 can receive the addressable content via another communication interface (e.g., an Ethernet or WI-FI interface).

The content presentation device 104 can then proceed to perform the ad insertion operation and can do so in various ways, perhaps depending on the type of ad insertion operation to be performed.

In one example, the content presentation device 104 performing an ad insertion operation can involve the content presentation device 104 modifying an underlying content segment by replacing it with addressable content. In this scenario, the content presentation device 104 can receive a linear sequence of content segments that includes the underlying content segment and associated metadata, and can also receive the addressable content segment, as discussed above. The content presentation device 104 can output for presentation the sequence of content segments up until the modification start time (which marks the start of the underlying content segment), at which time the content presentation device 104 can switch to outputting for presentation the addressable content instead. Then, at the modification end time (which marks the end of the underlying content segment), the content presentation device 104 can switch back to outputting for presentation the content that follows in the linear sequence of content segments (or perhaps to other content, such as additional addressable content that is replacing an additional underlying content segment).

In one example configuration, the act of the content presentation device 104 switching from outputting the sequence of content segments to outputting the addressable content can involve the content presentation device 104 switching from using first data in a first input buffer where the sequence of content segments is being received to using second data in a second input buffer where the addressable content is being received, to populate a display buffer.

In another example, the content presentation device 104 performing an ad insertion operation can involve the content presentation device 104 modifying an underlying content segment by overlaying on the underlying content segment, overlay content. In this scenario, the content presentation device 104 can again receive a linear sequence of content segments that includes the underlying content segment and associated metadata, and it can also receive the addressable content, as described above. The content presentation device 104 can then output for presentation the underlying content segment as it ordinarily would, except that starting at the modification start time, the content presentation device 104 can begin overlaying the addressable content on the underlying content segment. The content presentation device 104 can continue doing this until the modification end time.

IV. Ad Insertion Decision-Making

As noted above, there may be scenarios in which performing an ad insertion process results in undesirable consequences. For instance, as further noted above, ad insertion can be undesirable when it would disrupt an advertisement campaign pacing for the underlying advertisement and/or the addressable advertisement, or when it would result in the presentation of a less profitable advertisement.

To help address these issues, the content modification system 100 can employ an informed decision-making process that takes into account various different factors of a given underlying advertisement and a given addressable advertisement when determining whether to perform an ad insertion process. This decision-making process can be performed on a per-advertisement basis for each individual content presentation device 104 that is eligible for an ad insertion. While the below processes are described as being performed by the content modification system 100 generally, it will be understood that the acts described below can be performed by particular systems or devices that are included within the content modification system 100, such as by the content management system 106.

In an example ad insertion decision-making process, the content modification system 100 can determine an expected value (Y) for a given ad insertion using the following formula:

$$V = R_{add} - P_{add} - R_{und} + P_{und}$$

where $R_{add}$ is the expected revenue gained by obtaining a single impression of the addressable advertisement, $P_{add}$ is a cost factor representing an amount of change to the pacing of the advertisement campaign of the addressable advertisement that would result from the ad insertion, $R_{und}$ is the expected revenue lost by losing a single impression of the underlying advertisement, and $P_{und}$ is a cost factor representing an amount of change to the pacing of the advertisement campaign of the underlying advertisement that would result from the ad insertion.

$R_{add}$ and $R_{und}$ can be determined in various ways. As an example, $R_{add}$ and $R_{und}$ can be determined using the CPMs of the addressable and underlying advertisements. For instance, because the CPM of an advertisement represents the cost that an advertiser pays per thousand impressions of the advertisement, then the cost that the advertiser would pay for a single impression (and therefore the expected revenue of a single impression) can be determined by dividing the CPM of the advertisement by one thousand.

Accordingly, in some examples, the content modification system 100 can determine $R_{add}$ and $R_{und}$ using the following formulas:

$$R_{add} = \frac{W_{add} CPM_{add}}{1000}$$

$$R_{und} = \frac{W_{und} CPM_{und}}{1000}$$

where $W_{add}$ and $W_{und}$ are weight factors for compensating for various other parameters, such as target demographic parameters, of the respective advertisement campaigns of the addressable and underlying advertisements.

As noted above, the content modification system 100 can perform this calculation for each individual content presentation device 104 that is eligible for an ad insertion. But certain content presentation devices 104 may be more likely to be viewed by end-users in the target demographic specified by the advertisement campaign, while other content presentation devices 104 may be less likely to be viewed by end-users in the target demographic. And $W_{add}$ and $W_{und}$ can compensate for these differences. For example, consider a scenario in which the addressable advertisement is associated with a target demographic of females between age 20 and age 35, while the underlying advertisement is associated with a target demographic of children under the age of 12. Consider also that the content modification system 100 has determined that, at the time of the ad insertion opportunity, a given content presentation device 104 has a 70% chance of being viewed by a female between age 20 and age 35 and a 50% chance of being viewed by a child under the age of 12. In such a scenario the content modification system 100 can choose $W_{add}$ to be 0.7 (or 70%) and $W_{und}$ to be 0.5 (or 50%).

Figure 3A:
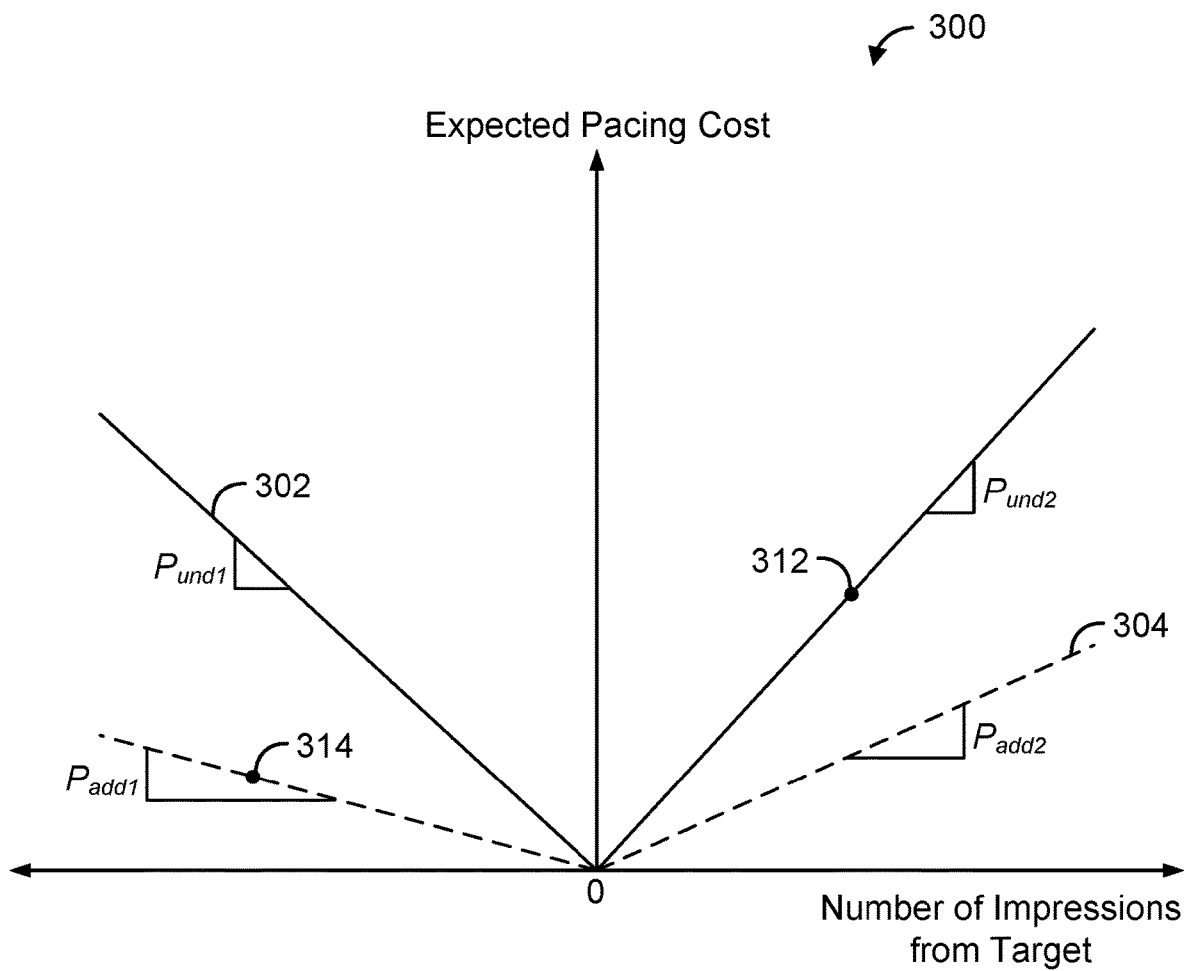
FIG. 3A is a graphical plot illustrating an example ad insertion decision-making configuration.

Referring next to the pacing cost factors $P_{und}$ and $P_{add}$, FIG. 3A depicts a graph 300 that illustrates how the content modification system 100 can determine these pacing cost factors and apply them in the above formulas. For a given ad insertion opportunity, the graph 300 plots the difference in the number of actual advertisement impressions from a target number of impressions (on the x-axis) versus the expected cost of the pacing of the advertisement (on the y-axis). As shown, the graph 300 includes a solid plot line 302 for the underlying advertisement and a dashed plot line 304 for the addressable advertisement.

The target number of impressions for a given advertisement can be determined based on its advertisement campaign schedule. For example, if an underlying advertisement is associated with an advertisement campaign that specifies the underlying advertisement should be viewed 100 times over five days, then after one day, the target number of impressions can be 20 impressions. This assumes a linear impression pattern, which may not always be the case, and so the target number of impressions can be determined by taking into consideration the expected audience numbers for each day of the campaign. Continuing with the example of an advertisement campaign that specifies 100 impressions over five days, an example of weighting the target impressions based on the expected daily audience is shown in the following table:

|  | Day 1 | Day 2 | Day 3 | Day 4 | Day 5 |
| --- | --- | --- | --- | --- | --- |
| Expected Audience | 100 | 30 | 50 | 50 | 50 |
| Target Impressions | 35.7 | 10.7 | 17.9 | 17.9 | 17.9 |

In any case, once the target numbers of impressions for both the underlying and addressable advertisements have been determined, then the content modification system 100 can determine the difference between the actual numbers of impressions and the target numbers of impressions for each advertisement and plot corresponding data points on the graph 300. For instance, if the actual number of impressions for the underlying advertisement is greater than the target number, this would correspond to a data point on plot line 302 to the right of the y-axis, as shown by data point 312. And if the actual number of impressions for the addressable advertisement is less than the target number, this would correspond to a data point on plot line 304 to the left of the y-axis, as shown by data point 314. Conversely, while not shown in FIG. 3A, if the actual number of impressions for the underlying advertisement is less than the target number, this would correspond to a data point on plot line 302 to the left of the y-axis, and if the actual number of impressions for the addressable advertisement is greater than the target number, this would correspond to a data point on plot line 304 to the right of the y-axis.

Continuing with the example illustrated in FIG. 3A, the content modification system 100 can determine the pacing factors $P_{und}$ and $P_{add}$ and use them to determine the overall expected value of the ad insertion. In particular, the pacing factors $P_{und}$ and $P_{add}$ can correspond to the slopes of the plot lines 302 and 304, respectively, at the data points 312 and 314. The underlying advertisement plot line 302 has a first slope $P_{und1}$ to the left of the y-axis and a second slope $P_{und2}$ to the right of the y-axis. Because data point 312 falls to the right of the y-axis in the present example (i.e., because the actual number of impressions exceeds the target number of impressions for the underlying advertisement campaign), then $P_{und}$ corresponds to $P_{und2}$. The addressable advertisement plot line 304 has a first slope $P_{add1}$ to the left of the y-axis and a second slope $P_{add2}$ to the right of the y-axis. And because data point 314 falls to the left of the y-axis (i.e., because the actual number of impressions is below the target number of impressions for the addressable advertisement campaign), then $P_{add}$ corresponds to $P_{add1}$.

Once the content modification system 100 has determined $P_{und}$ and $P_{add}$, the content modification system 100 can use these values (along with the determined $R_{add}$ and $R_{und}$ values) to determine the overall expected value V of an ad insertion using the formula above. In the present example, $P_{und}$ is a positive value (because it corresponds to positive slope $P_{und2}$) and $P_{add}$ is negative (because it corresponds to negative slope $P_{add1}$). Therefore, in the above equation for V, subtracting $P_{add}$ and adding $P_{und}$ would both increase the value of V. This is expected, because it would be beneficial to both increase the number of presented addressable advertisements (which are currently below the target number of impressions) and decrease the number of presented underlying advertisements (which are currently above the target number of impressions).

As noted above, the content modification system 100 can determine the expected value V of an ad insertion on a per-advertisement and per-content presentation device 104 basis. For instance, for a given ad insertion opportunity on a given content presentation device 104, the content modification system 100 can determine expected values V for several different available addressable advertisements. As such, for all content presentation devices 104 faced with the same ad insertion opportunity, the content modification system 100 can determine a multitude of different expected ad insertion values.

The content modification system 100 can use these expected values to determine which ad insertion opportunities are desirable for inserting ads (and which addressable advertisement content to insert) and which ad insertion opportunities are desirable for refraining from inserting ads and instead presenting the underlying advertisement content. As an example, for a given content presentation device 104, the content modification system 100 can identify a subset of addressable advertisements for an ad insertion opportunity that have an expected ad insertion value above a threshold value and select an addressable advertisement from the identified subset for insertion. In some examples, the content modification system 100 can select the addressable advertisement that has the highest expected ad insertion value. And if no addressable advertisements have an expected insertion value above the threshold value, then the content modification system 100 can refrain from performing the ad insertion process and instead cause the underlying advertisement to be presented.

In some examples, content modification system 100 can take additional factors of the advertisement campaigns into consideration when determining which ad insertion opportunities are desirable for inserting ads. For example, an advertisement campaign can specify a frequency cap, which can limit the frequency (e.g., number per day or per commercial break) at which an advertisement is presented by a content presentation device 104. As another example, an advertisement campaign can specify creative separation rules, such as rules that specify whether advertisements from one company are permitted to be presented in the same commercial break as advertisements from another company. Thus, if insertion of an addressable advertisement would violate the specified frequency cap or creative separation rules, then the content modification system 100 can refrain from inserting the addressable advertisement regardless of how high the expected insertion value is.

Further, for a given addressable advertisement, the content modification system 100 can identify which content presentation device 104 to select for presenting the addressable advertisement. For instance, the content modification system 100 can identify a subset of content presentation devices 104 for which the addressable advertisement has an expected insertion value above a threshold value and cause those content presentation devices 104 to perform the ad insertion process. In this scenario, the content modification system 100 can similarly disregard certain content presentation devices 104 if the ad insertion would violate advertisement campaign rules, such as frequency cap or creative separation rules.

In some examples, a content owner of the underlying advertisement content and/or the addressable advertisement content may want some control over whether an addressable advertisement is inserted over an underlying advertisement. For instance, the content owner can be able to control the values of $P_{und}$ and $P_{add}$, and therefore control the expected values associated with a given ad insertion opportunity. Because the values of $P_{und}$ and $P_{add}$ correspond to the slopes of plot lines 302 and 304, the values of $P_{und}$ and $P_{add}$ can be controlled by adjusting the slopes of the plot lines 302 and 304.

Figure 3B:
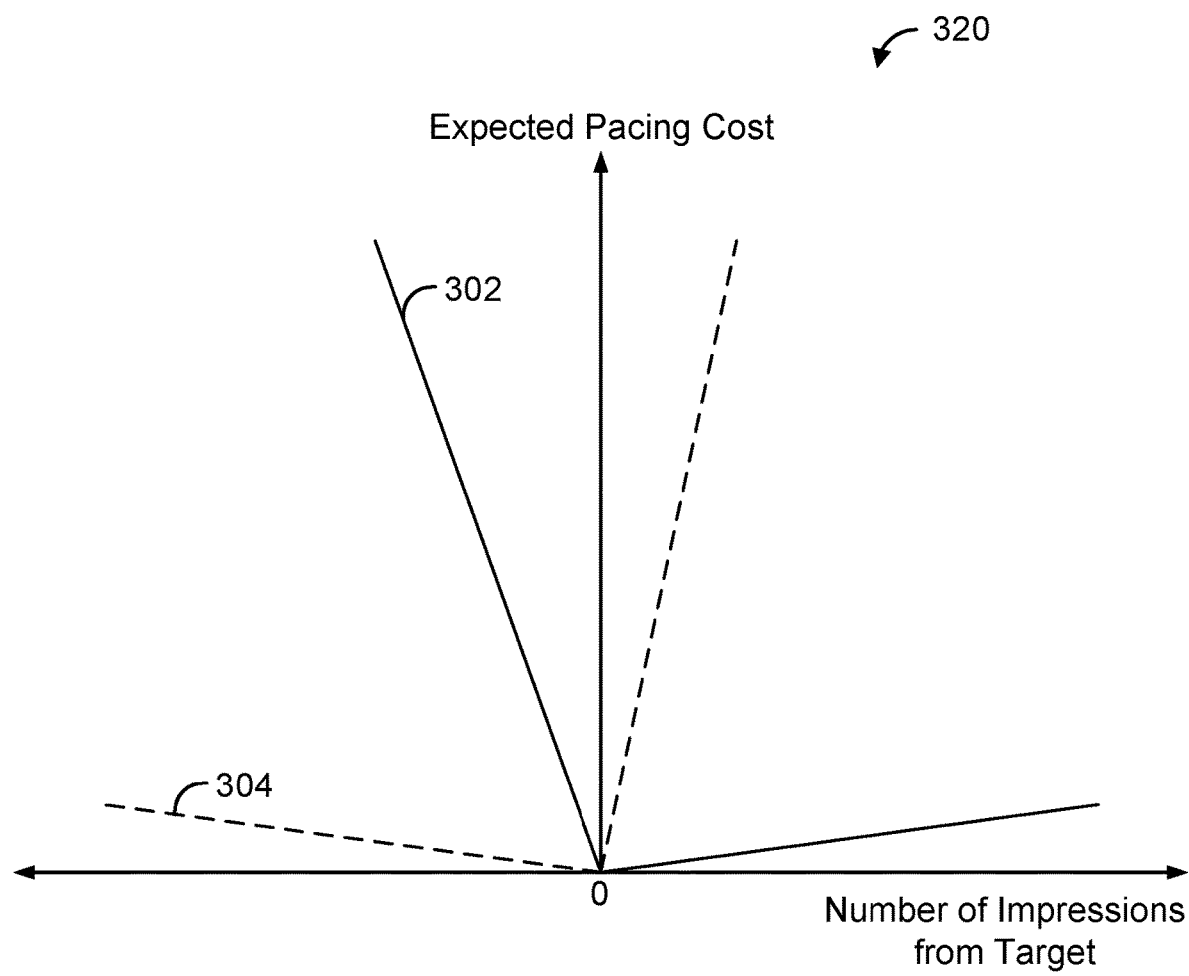
FIG. 3B is a graphical plot illustrating an example ad insertion decision-making configuration.
Figure 3C:
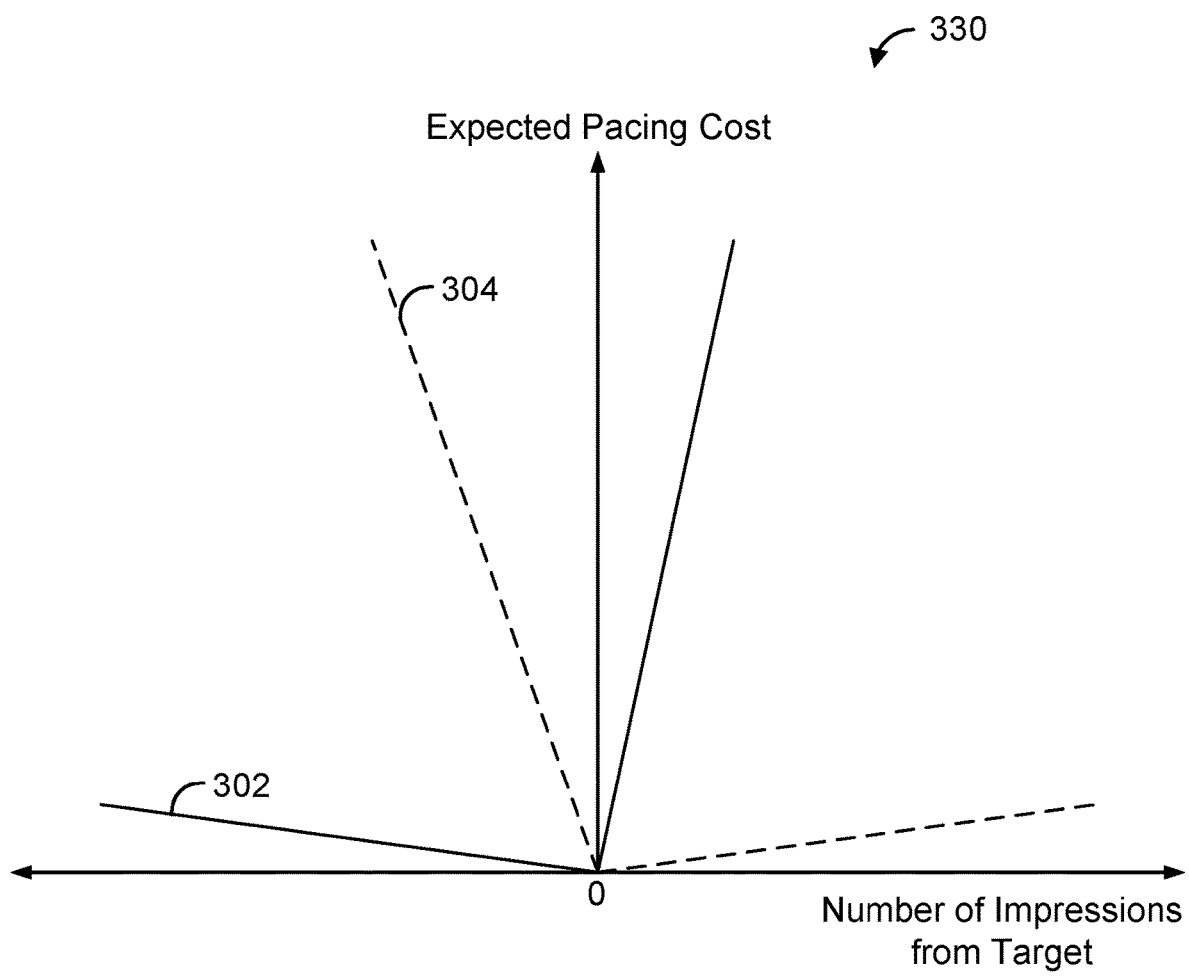
FIG. 3C is a graphical plot illustrating an example ad insertion decision-making configuration.

FIGS. 3B and 3C depict example plot line configurations 320 and 330 that have been modified by a content owner. FIG. 3B depicts a conservative configuration 320 that causes an ad insertion to be less likely. To achieve this, the underlying advertisement plot line 302 assigns high pacing costs when presenting too few underlying ads and too many addressable ads and assigns low pacing costs when presenting too many underlying ads and too few addressable ads. FIG. 3C, on the other hand, depicts an aggressive configuration 330 that causes an ad insertion to be more likely. To achieve this, the underlying advertisement plot line 302 assigns high pacing costs when presenting too many underlying ads and too few addressable ads and assigns low pacing costs when presenting too few underlying ads and too many addressable ads.

In order to facilitate the content owner controlling whether an addressable advertisement is inserted over an underlying advertisement, the content modification system 100 can receive one or more control parameters from the content owner. As an example, the content owner can specify to the content modification system 100 that it wishes to employ a conservative, moderate, or aggressive ad insertion decision-making process. If the content owner specifies a conservative decision-making process, then the content modification system 100 can use the configuration 320 depicted in FIG. 3B. If the content owner specifies a moderate decision-making process, then the content modification system 100 can use the configuration 300 depicted in FIG. 3A. And if the content owner specifies an aggressive decision-making process, then the content modification system 100 can use the configuration 330 depicted in FIG. 3C. In other examples, the content owner can specify additional and/or alternative decision-making processes that can correspond to additional and/or alternative configurations than those depicted in FIGS. 3A-3C.

Further, in some examples, the content owner can directly specify the $P_{und}$ and $P_{add}$ parameters, such as by providing values for those parameters or by providing a custom configuration similar to those depicted in FIGS. 3A-3C. When providing such a custom configuration, the content owner can specify asymmetric slopes for each of plot lines 302 and 304, and therefore asymmetric values for the $P_{und}$ and $P_{add}$ parameters. For instance, as shown in FIGS. 3A-3C, the slope of plot line 302 to the left of the y-axis, which corresponds to $P_{und1}$, can be different from the slope of plot line 302 to the right of the y-axis, which corresponds to $P_{und2}$. Similarly, the slope of plot line 304 to the left of the y-axis, which corresponds to $P_{add1}$, can be different from the slope of plot line 304 to the right of the y-axis, which corresponds to $P_{add2}$. This allows the content owner to individually control how much weight to assign to (i) underserving underlying ads, (ii) overserving underlying ads, (iii) underserving addressable ads, and (iv) overserving addressable ads. This additional control can be desirable to content owners, as it allows the content owner to finely tune how conservative or aggressive the content modification system 100 should be when determining whether to perform an ad insertion process.

Figure 4:
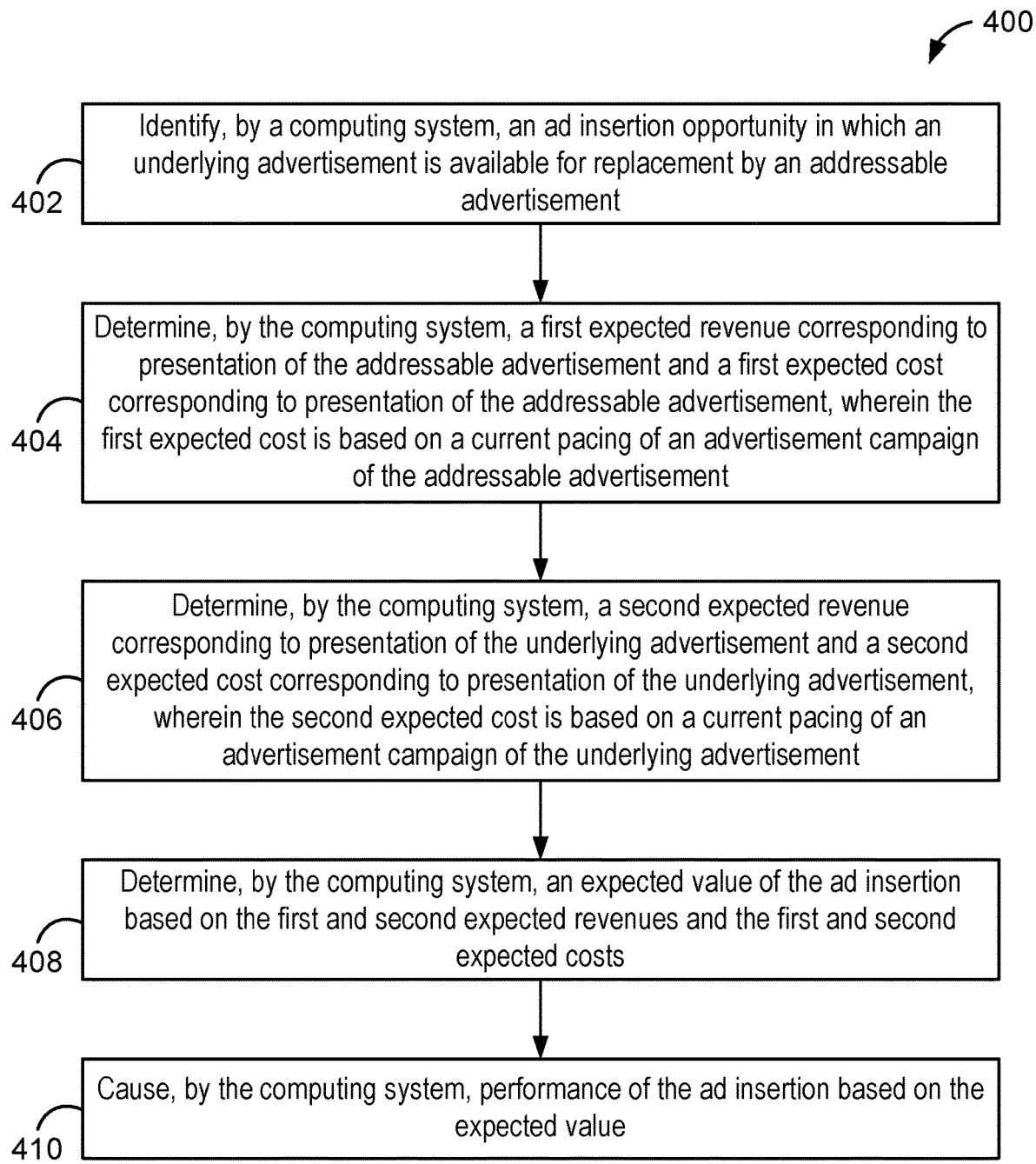
FIG. 4 is a flow chart of an example method.

FIG. 4 is a flow chart illustrating an example method 400. The method 400 can be implemented by any computing system described herein, such as by the content modification system 100 or by particular systems or devices that are included within the content modification system 100, such as by the content management system 106. Various embodiments of the method 400 include one or more operations, acts, and/or functions illustrated by blocks 402 through 410. While the blocks are illustrated in sequential order, these blocks may also be performed in parallel, and/or in a different order than the order disclosed and described herein, where possible. Also, the various blocks may be combined into fewer blocks, divided into additional blocks, and/or removed based upon a desired implementation.

In addition, for the method 400 and for other processes and methods disclosed herein, the flowchart shows functionality and operation of one possible implementation of some embodiments. In this regard, each block can represent a module or a portion of program code that includes one or more instructions executable by one or more processors for implementing specific logical functions or steps in the process. The program code can be stored on any type of computer-readable medium, for example, such as a storage device including a disk or hard drive. The computer-readable medium can include non-transitory computer-readable media, for example, such as tangible, non-transitory computer-readable media that stores data for short periods of time like register memory, processor cache, and Random-Access Memory (RAM). The computer-readable medium can also include non-transitory media, such as secondary or persistent long-term storage, like read only memory (ROM), optical or magnetic disks, compact-disc read only memory (CD-ROM), for example. The computer-readable media can also be any other volatile or non-volatile storage system. In addition, for the method 400 and for other processes and methods disclosed herein, each block in FIG. 4 can represent circuitry that is wired to perform the specific logical functions in the process.

The method 400 begins at block 402, which involves a computing system identifying an ad insertion opportunity in which an underlying advertisement is available for replacement by an addressable advertisement.

At block 404, the method 400 involves the computing system determining a first expected revenue corresponding to presentation of the addressable advertisement and a first expected cost corresponding to presentation of the addressable advertisement. In some examples, determining the first expected revenue includes determining the first expected revenue based on a CPM of the addressable advertisement. And determining the first expected revenue can further include applying a first weight factor to the first expected revenue based on expected demographic information of a viewer.

Further, at block 404, the first expected cost is based on a current pacing of an advertisement campaign of the addressable advertisement. For instance, in some examples, the first expected cost is higher when the current pacing of the advertisement campaign of the addressable advertisement is ahead of schedule than when the current pacing of the advertisement campaign of the addressable advertisement is behind schedule. And in some examples, determining the first expected cost can involve determining the first expected cost based on a graph plotting cost versus a difference between a target number of advertisement impressions and a current number of advertisement impressions, as described above in connection with FIGS. 3A-3C. Namely, determining the first expected cost can involve determining the first expected cost based on a slope of a curve plotted on the graph. In such examples, the method 400 can further involve receiving a user input that controls the slope of the curve plotted on the graph. Additionally or alternatively, the method 400 can further involve receiving a user input representing a selection of a risk profile, and the first expected cost can be determined based on the selected risk profile.

At block 406, the method 400 involves the computing system determining a second expected revenue corresponding to presentation of the underlying advertisement and a second expected cost corresponding to presentation of the underlying advertisement. In some examples, determining the second expected revenue comprises determining the second expected revenue based on a CPM of the underlying advertisement. And determining the second expected revenue can further include applying a second weight factor to the second expected revenue based on expected demographic information of a viewer.

Further, at block 406, the second expected cost is based on a current pacing of an advertisement campaign of the underlying advertisement. For instance, in some examples, the second expected cost is higher when the current pacing of the advertisement campaign of the underlying advertisement is ahead of schedule than when the current pacing of the advertisement campaign of the underlying advertisement is behind schedule. And in some examples, determining the second expected cost comprises determining the second expected cost based on a graph plotting cost versus a difference between a target number of advertisement impressions and a current number of advertisement impressions, as described above in connection with FIGS. 3A-3C. Namely, determining the second expected cost can involve determining the second expected cost based on a slope of a curve plotted on the graph. In such examples, the method 400 can further involve receiving a user input that controls the slope of the curve plotted on the graph. Additionally or alternatively, the method 400 can further involve receiving a user input representing a selection of a risk profile, and the second expected cost can be determined based on the selected risk profile.

At block 408, the method 400 involves the computing system determining an expected value of the ad insertion based on the first and second expected revenues and the first and second expected costs. In line with the discussion above, this determination can be made using the following formula:

$$V=R_{add}-P_{add}-R_{und}+P_{und},$$

where V is the expected value, $R_{add}$ is the first expected revenue, $P_{add}$ is the first expected cost, $R_{und}$ is the second expected revenue, and $P_{und}$ is the second expected cost.

At block 410, the method 400 involves the computing system causing performance of the ad insertion based on the expected value. As described above, causing performance of the ad insertion based on the expected value can involve causing performance of the ad insertion based on the expected value being at least a threshold value. And in examples where multiple ad insertion opportunities have expected values above the threshold value, the method 400 can involve causing performance of the ad insertion with the highest expected value.

V. Example Variations

Although the examples and features described above have been described in connection with specific entities and specific operations, in practice, there are likely to be many instances of these entities and many instances of these operations being performed, perhaps contemporaneously or simultaneously, on a large scale. Indeed, in practice, the content modification system 100 is likely to include many content distribution systems (each potentially transmitting content on many channels) and many content presentation devices, with some or all of the described operations being performed on a routine and repeating basis in connection with some or all of these entities.

In addition, although some of the acts described in this disclosure have been described as being performed by a particular entity, the acts can be performed by any entity, such as the other entities described in this disclosure. Further, although the acts have been recited in a particular order, the acts need not be performed in the order recited. However, in some instances, it can be desired to perform the acts in the order recited or in another order. Further, each of the acts can be performed responsive to performance of one or more of the other acts. Also, not all of the acts need to be performed to achieve one or more of the benefits provided by the disclosed features, and therefore not all of the acts are required.

Although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects.

The invention claimed is:

1. A method comprising:
    identifying a current channel on which a content presentation device is receiving content, wherein identifying the current channel comprises:
        receiving reference fingerprint data from a content distribution system associated with a known channel;
        receiving query fingerprint data from the content presentation device;
        comparing the reference fingerprint data to the query fingerprint data to determine a match, wherein the match indicates that the known channel associated with the content distribution system is the current channel providing the content for display;
    identifying, by a computing system, an ad insertion opportunity, on the current channel, in which an underlying advertisement associated with content to be displayed is available for replacement by an addressable advertisement;
    determining, by the computing system, that a value that specifies a conservative indication of an ad insertion decision-making process or aggressive indication of the ad insertion decision-making process for an aggressiveness configuration was received from a content owner of the content to be displayed, wherein the conservative indication corresponds to setting a high pacing cost for presenting too few impressions of the underlying advertisement and too many of the addressable advertisement which causes the replacement to be less likely based on the value for the aggressiveness configuration, and wherein the aggressive indication corresponds to setting a high pacing cost for presenting too many impressions of the underlying advertisement and too few of the addressable advertisement which causes the replacement to be more likely based on the value for the aggressiveness configuration;
    determining, by the computing system, a first expected revenue corresponding to presentation of the addressable advertisement and a first expected cost corresponding to the presentation of the addressable advertisement, wherein the first expected cost is based on a current pacing of an advertisement campaign of the addressable advertisement;
    determining, by the computing system, a second expected revenue corresponding to presentation of the underlying advertisement and a second expected cost corresponding to the presentation of the underlying advertisement, wherein the second expected cost is based on a current pacing of an advertisement campaign of the underlying advertisement;
    determining, by the computing system, an expected value of the ad insertion opportunity based on the first and second expected revenues and the first and second expected costs, wherein at least one of the current pacing of the advertisement campaign of the addressable advertisement or the current pacing of the advertisement campaign of the underlying advertisement was adjusted based on the value of the aggressiveness configuration;
    replacing, by the computing system, the underlying advertisement with the addressable advertisement in the content to be displayed based on the expected value of the ad insertion opportunity being at least a threshold value; and
    providing the content including the addressable advertisement, for display via the content presentation device.

2. The method of claim 1, wherein determining the first expected revenue comprises determining the first expected revenue based on a cost per mille (CPM) of the addressable advertisement, and determining the second expected revenue comprises determining the second expected revenue based on a CPM of the underlying advertisement.

3. The method of claim 1, wherein determining the first expected revenue comprises applying a first weight factor to the first expected revenue based on expected demographic information of a viewer, and determining the second expected revenue comprises applying a second weight factor to the second expected revenue based on the expected demographic information of the viewer.

4. The method of claim 1, wherein the first expected cost is higher when the current pacing of the advertisement campaign of the addressable advertisement is ahead of schedule than when the current pacing of the advertisement campaign of the addressable advertisement is behind schedule, and wherein the second expected cost is higher when the current pacing of the advertisement campaign of the underlying advertisement is ahead of schedule than when the current pacing of the advertisement campaign of the underlying advertisement is behind schedule.

5. The method of claim 1, wherein determining the first or second expected costs comprises determining the first or second expected costs based on a graph plotting cost versus a difference between a target number of advertisement impressions and a current number of advertisement impressions.

6. The method of claim 5, wherein determining the first or second expected costs comprises determining the first or second expected costs based on a slope of a curve plotted on the graph.

7. The method of claim 6, further comprising receiving a user input that controls the slope of the curve plotted on the graph.

8. The method of claim 1, further comprising receiving a user input representing a selection of a risk profile, wherein the first expected cost is determined, at least in part, based on the risk profile.

9. The method of claim 1, wherein determining the expected value of the ad insertion opportunity comprises determining the expected value of the ad insertion opportunity using the following formula:

$$V = R_{add} - P_{add} - R_{und} + P_{und},$$

wherein V is the expected value, $R_{add}$ is the first expected revenue, $P_{add}$ is the first, expected cost, $R_{und}$ is the second expected revenue, and $P_{und}$ Is the second expected cost.

10. The method of claim 1, wherein the replacing comprises:
identifying a first advertisement associated with the content to be displayed;
identifying separation rules indicating whether the first advertisement and the addressable advertisement can both be displayed; and
determining, based on the separation rules, that the first advertisement and the addressable advertisement can both be displayed.

11. The method of claim 1, wherein the replacing comprises:
providing a request, while the content is playing, for the addressable advertisement, the request comprising at least one of: a duration of the underlying advertisement or an indication as to whether an overlay or replacement is requested.

12. A computing system comprising:
one or more processors; and
a non-transitory, computer-readable medium having stored thereon program instructions that, when executed by the one or more processors, cause the computing system to perform operations comprising:
identifying a current channel on which a content presentation device is receiving content, wherein identifying the current channel comprises:
receiving reference fingerprint data from a content distribution system associated with a known channel;
receiving query fingerprint data from the content presentation device;
comparing the reference fingerprint data to the query fingerprint data to determine a match, wherein the match indicates that the known channel associated with the content distribution system is the current channel providing the content for display;
identifying an ad insertion opportunity, on the current channel, in which an underlying advertisement associated with content to be displayed is available for replacement by an addressable advertisement;
determining that a value that specifies a conservative indication of an ad insertion decision-making process or aggressive indication of the ad insertion decision-making process for an aggressiveness configuration was received from a content owner of the content to be displayed, wherein the conservative indication corresponds to setting a high pacing cost for presenting too few impressions of the underlying advertisement and too many of the addressable advertisement which causes the replacement to be less likely based on the value for the aggressiveness configuration, and wherein the aggressive indication corresponds to setting a high pacing cost for presenting too many impressions of the underlying advertisement and too few of the addressable advertisement which causes the replacement to be more likely based on the value for the aggressiveness configuration;
determining a first expected revenue corresponding to presentation of the addressable advertisement and a first expected cost corresponding to the presentation of the addressable advertisement, wherein the first expected cost is based on a current pacing of an advertisement campaign of the addressable advertisement;
determining a second expected revenue corresponding to presentation of the underlying advertisement and a second expected cost corresponding to the presentation of the underlying advertisement, wherein the second expected cost is based on a current pacing of an advertisement campaign of the underlying advertisement;
determining an expected value of the ad insertion opportunity based on the first and second expected revenues and the first and second expected costs, wherein at least one of the current pacing of the advertisement campaign of the addressable advertisement or the current pacing of the advertisement campaign of the underlying advertisement was adjusted based on the value of the aggressiveness configuration;
replacing the underlying advertisement with the addressable advertisement in the content to be displayed based on the expected value of the ad insertion opportunity being at least a threshold value; and
providing the content including the addressable advertisement, for display via the content presentation device.

13. The computing system of claim 12, wherein determining the first expected revenue comprises applying a first weight factor to the first expected revenue based on expected demographic information of a viewer, and determining the second expected revenue comprises applying a second weight factor to the second expected revenue based on the expected demographic information of the viewer.

14. The computing system of claim 12, wherein the first expected cost is higher when the current pacing of the advertisement campaign of the addressable advertisement is ahead of schedule than when the current pacing of the advertisement campaign of the addressable advertisement is behind schedule, and wherein the second expected cost is higher when the current pacing of the advertisement campaign of the underlying advertisement is ahead of schedule than when the current pacing of the advertisement campaign of the underlying advertisement is behind schedule.

15. The computing system of claim 12, wherein determining the first or second expected costs comprises determining the first or second expected costs based on a graph plotting cost versus a difference between a target number of advertisement impressions and a current number of advertisement impressions.

16. The computing system of claim 15, wherein determining the first or second expected costs comprises determining the first or second expected costs based on a slope of a curve plotted on the graph.

17. A non-transitory, computer-readable medium having stored thereon program instructions that, when executed by one or more processors of a computing system, cause the computing system to perform operations comprising:
identifying a current channel on which a content presentation device is receiving content, wherein identifying the current channel comprises:
receiving reference fingerprint data from a content distribution system associated with a known channel;
receiving query fingerprint data from the content presentation device;
comparing the reference fingerprint data to the query fingerprint data to determine a match, wherein the match indicates that the known channel associated with the content distribution system is the current channel providing the content for display;
identifying an ad insertion opportunity, on the current channel, in which an underlying advertisement associated with content to be displayed is available for replacement by an addressable advertisement;
determining that a value that specifies a conservative indication of an ad insertion decision-making process or aggressive indication of the ad insertion decision-making process for an aggressiveness configuration was received from a content owner of the content to be displayed, wherein the conservative indication corresponds to setting a high pacing cost for presenting too few impressions of the underlying advertisement and too many of the addressable advertisement which causes the replacement to be less likely based on the value for the aggressiveness configuration, and wherein the aggressive indication corresponds to setting a high pacing cost for presenting too many impressions of the underlying advertisement and too few of the addressable advertisement which causes the replacement to be more likely based on the value for the aggressiveness configuration;
determining a first expected revenue corresponding to presentation of the addressable advertisement and a first expected cost corresponding to the presentation of the addressable advertisement, wherein the first expected cost is based on a current pacing of an advertisement campaign of the addressable advertisement;
determining a second expected revenue corresponding to presentation of the underlying advertisement and a second expected cost corresponding to the presentation of the underlying advertisement, wherein the second expected cost is based on a current pacing of an advertisement campaign of the underlying advertisement;
determining an expected value of the ad insertion opportunity based on the first and second expected revenues and the first and second expected costs, wherein at least one of the current pacing of the advertisement campaign of the addressable advertisement or the current pacing of the advertisement campaign of the underlying advertisement was adjusted based on the value of the aggressiveness configuration;
replacing the underlying advertisement with the addressable advertisement in the content to be displayed based on the expected value of the ad insertion opportunity being at least a threshold value; and
providing the content including the addressable advertisement, for display via the content presentation device.

18. The non-transitory, computer-readable medium of claim 17, wherein determining the first expected revenue comprises applying a first weight factor to the first expected revenue based on expected demographic information of a viewer, and determining the second expected revenue comprises applying a second weight factor to the second expected revenue based on the expected demographic information of the viewer.

19. The non-transitory, computer-readable medium of claim 17, wherein the first expected cost is higher when the current pacing of the advertisement campaign of the addressable advertisement is ahead of schedule than when the current pacing of the advertisement campaign of the addressable advertisement is behind schedule, and wherein the second expected cost is higher when the current pacing of the advertisement campaign of the underlying advertisement is ahead of schedule than when the current pacing of the advertisement campaign of the underlying advertisement is behind schedule.

20. The non-transitory, computer-readable medium of claim 17, wherein determining the first or second expected costs comprises determining the first or second expected costs based on a graph plotting cost versus a difference between a target number of advertisement impressions and a current number of advertisement impressions.

21. The non-transitory, computer-readable medium of claim 20, wherein determining the first or second expected costs comprises determining the first or second expected costs based on a slope of a curve plotted on the graph.

22. The non-transitory, computer-readable medium of claim 17, wherein determining the expected value of the ad insertion opportunity comprises determining the expected value of the ad insertion opportunity using the following formula:

$$V = R_{add} - P_{add} - R_{und} + P_{und},$$

wherein V is the expected value, $R_{add}$ is the first expected revenue, $P_{add}$ is the first, expected cost, $R_{und}$ is the second expected revenue, and $P_{und}$ is the second expected cost.

* * * * *

UNITED STATES PATENT AND TRADEMARK OFFICE
CERTIFICATE OF CORRECTION

| | |
|---|---|
| PATENT NO. | : 11,900,411 B2 |
| APPLICATION NO. | : 16/949014 |
| DATED | : February 13, 2024 |
| INVENTOR(S) | : Sullivan et al. |

It is certified that error appears in the above-identified patent and that said Letters Patent is hereby corrected as shown below:

In the Specification

In Column 1, Line 9, delete "USAGE" and insert the same on Line 10 before "and" as a continuation point.

In Column 9, Line 22, delete "(Y)" and insert -- (V) --, therefor.

In the Claims

In Column 17, Claim 9, Line 44, delete "first," and insert -- first --, therefor.

In Column 17, Claim 9, Line 45, delete "Is" and insert -- is --, therefor.

In Column 20, Claim 22, Line 62, delete "first," and insert -- first --, therefor.

Signed and Sealed this
Twenty-eighth Day of May, 2024

Katherine Kelly Vidal
*Director of the United States Patent and Trademark Office*